United States Patent [19]
Stephens

[11] 3,901,264
[45] Aug. 26, 1975

[54] ADJUSTABLE FLOW CONTROL FOR HYDRAULIC VALVES HAVING HIGH PRESSURE MAIN SUPPLY AND CONTROLS FLUID FLOW TO CYLINDER AND EXHAUST PORTS

[75] Inventor: William T. Stephens, New Brighton, Minn.

[73] Assignee: Gresen Manufacturing Company, Minneapolis, Minn.

[22] Filed: Mar. 6, 1972

[21] Appl. No.: 231,961

[52] U.S. Cl. ............ 137/118; 137/117; 137/596.12; 137/119
[51] Int. Cl. ..................... F15b 13/02; F15b 15/00
[58] Field of Search . 137/539, 596, 596.12, 625.69, 137/115, 116, 117, 118, 119

[56]    References Cited
    UNITED STATES PATENTS
2,611,045  9/1952  Wayman ............................. 137/539
3,133,559  5/1964  Tennis .............................. 137/596
3,283,773  11/1966 Lowman ........................ 137/596.12
3,358,711  12/1967 Pruvot ............................. 137/596
3,534,774  10/1970 Tennis ......................... 137/625.69
3,563,137  2/1971  Graber ............................. 137/596

Primary Examiner—Martin P. Schwadron
Assistant Examiner—George L. Walton
Attorney, Agent, or Firm—Warren A. Strum

[57]    ABSTRACT

An adjustable flow control for a hydraulic valve that may be used to vary the flow of fluid to a load connected to one or more valves in a stack valve assembly.

A stationary flow control sleeve, having a load check seat in fluid communication with the high pressure main in a hydraulic valve is provided with a check valve that is adjustably disposed therein to be operable in a position of engagement with the seat to prevent flow of fluid in one direction and to provide an orifice of variable size to permit a controlled rate of fluid flow in the other direction. The presence of high pressure fluid in the high pressure main raises the check valve to establish the orifice which depends upon the relationship of the check valve with the seat on the stationary flow control sleeve.

A movable flow control sleeve is operative to bypass excess fluid from the high pressure main to an exhaust port and includes a provision for balancing excess pressure in the high pressure main.

4 Claims, 2 Drawing Figures

ADJUSTABLE FLOW CONTROL FOR HYDRAULIC VALVES HAVING HIGH PRESSURE MAIN SUPPLY AND CONTROLS FLUID FLOW TO CYLINDER AND EXHAUST PORTS

SUMMARY OF THE INVENTION

My invention provides an externally adjustable flow control which incorporates a load check valve to establish a flow control orifice. A stationary valve seat for a load check valve is disposed in fluid communication with the high pressure main in a hydraulic valve. A check valve is configured to engage the seat to prevent flow of fluid in one direction and to be raised by the presence of fluid under pressure in the high pressure main to establish an orifice which will allow the flow of fluid from the high pressure main to a high pressure loop or passageway which may be connected to a cylinder port. A flow control sleeve that is biased to a first position by a suitable spring exhibiting a force substantially equal to, for example, 50 psi, is operative to maintain the flow control sleeve in the first position. Should the pressure that may be present in the high pressure main rise to a predetermined value, which is influenced by the rate of flow of fluid through the orifice established between the valve seat and the check valve, the flow control sleeve may tend to move toward a second position whereat it may allow fluid in excess of that required to maintain the flow desired to be bypassed either to another valve or to exhaust.

The orifice established between the check valve and its seat may be determined by an adjustable stop which will limit movement of the check valve with respect to its seat or other orifices which may be present intermediate the high pressure main and a cylinder passageway or loop. Such a stop may be easily adjustable through suitable motion transmitting means.

The flow control valve also includes a balancing arrangement whereby operation of downstream valves which may cause an increase in pressure in high pressure main may be compensated for to maintain the desired flow irrespective of the increase in pressure.

These and other objects and advantages of my invention will become apparent from a consideration of the appended specification, claims and drawings in which;

FIG. 1 is a side elevational view of a stack valve assembly to which the principles of my invention have been applied; and FIG. 2 is an enlarged sectional view of one of the valves taken along section line 2—2 on FIG. 1 of the drawings.

DESCRIPTION OF THE PREFERRED EMBODIMENT

Figure 1:
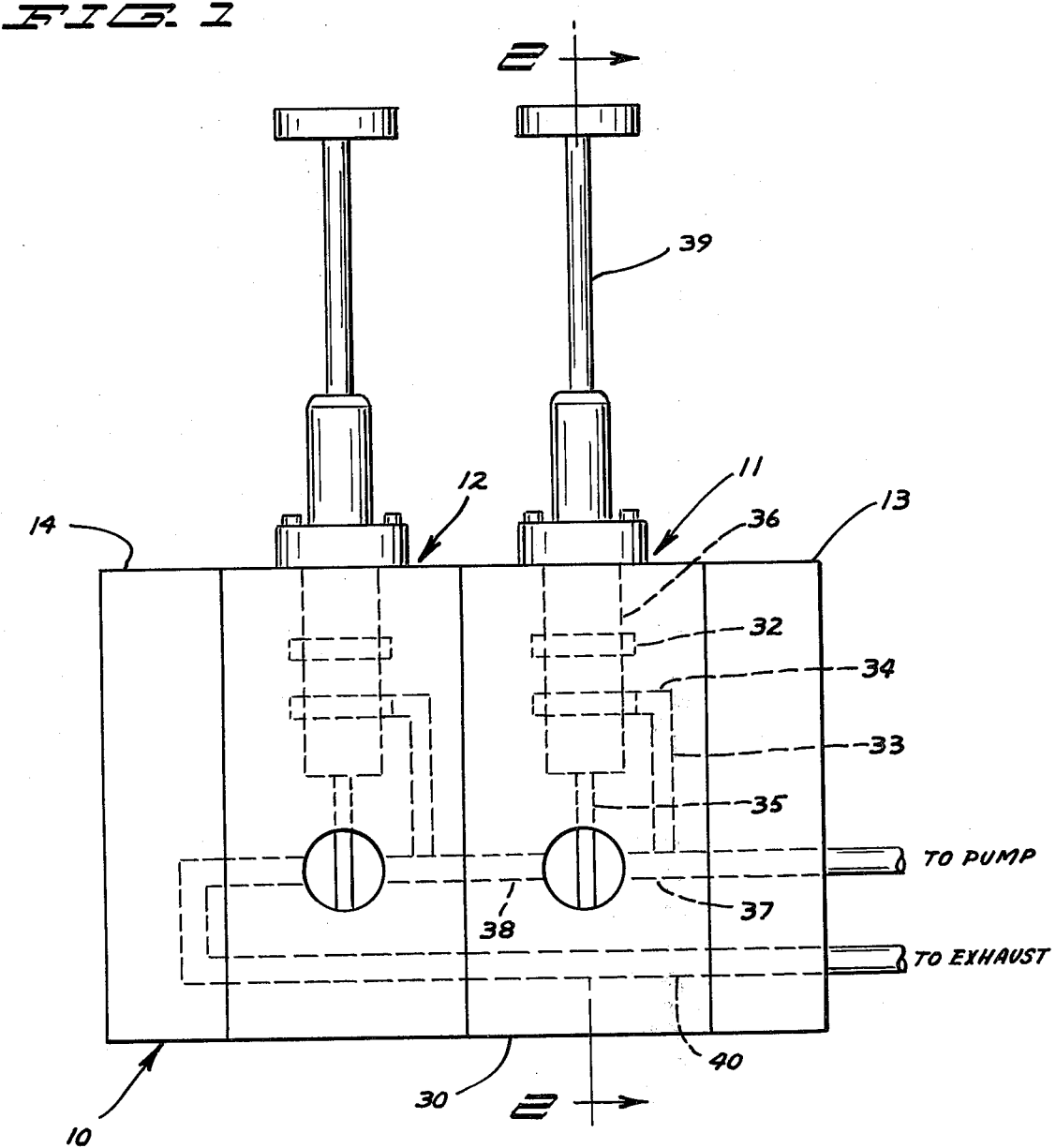

Referring now to the drawings, there is shown, in FIG. 1 a stack valve assembly 10 which includes an upstream valve 11, a downstream valve 12, and cover plates 13 and 14. Cover plate 13 is shown having a pair of tubes connected thereto which are labeled with the legends "to pump" and "to exhaust" to represent the manner in which cover plate 13 may be connected to a suitable source of fluid under pressure. Cover 14 is shown having an internal passageway that is connected to the exhaust tube. Since valves 11 and 12 may be the same or similar in construction, only valve 11 has been provided with reference characters.

Valve 11 is shown having a body 30 and includes a high pressure loop 31 and high pressure groove 32. A high pressure main 33, and a high pressure groove 34. An excess fluid duct 35 is in fluid communication with a flow control bore 36. Valve body 30 also includes a pump inlet 37, a downstream outlet 38, an exhaust port 40 and cylinder ports 41 and 42. A control bushing 43 is shown disposed at the top end of flow control bore 36 and includes an internal thread and a threaded adjustable stop disposed therein for reciprocal vertical movement. Control handle and shaft 39 is shown operatively engaged with the top end of adjustable stop 45. A fixed sleeve 47 is shown having a valve seat 48, cross holes 61, cross holes 49, cross holes 50 and an external groove 51. Cross holes 61 are disposed above check valve seat 48 and cross holes 49 are disposed below check valve seat 48 and open outwardly onto groove 51. Cross holes 50 open outwardly into flow control bore 36 and an interior bore therefrom opens downwardly into excess fluid duct 35 that is connected to downstream outlet 38. A check valve 52 is shown reciprocably disposed in the top end of fixed sleeve 47 and includes a centrally disposed orifice 56 adapted to receive a ball check valve 53 that is biased into engagement with orifice 56 through spring 55 and an operator 54. Check valve 52 also includes a generally centrally disposed outwardly facing groove and a plurality of cross holes which have not been identified with reference characters.

A flow control sleeve 58 is coaxially disposed to be axially slidable on the outside of fixed sleeve 47 and includes upper cross holes 59, a biasing spring 60 and lower cross holes 63. The lower end of flow control sleeve 58 is adapted to sealingly engage the bottom of flow control bore 36. Lower cross holes 63 are in fluid communication with the outwardly facing groove 51 in fixed sleeve 47 and upper cross holes 59 are adjacent an inwardly opening groove on the top end of flow control sleeve 58. A valve spool 62 is shown reciprocably movable in a bore in valve body 30 and includes a plurality of grooves which may be utilized to selectively connect cylinder ports 41 and 42 to exhaust or the high pressure loop and to control the flow of fluid through the open center configuration that is shown disposed intermediate pump inlet 37 and downstream outlet 38.

OPERATION

Figure 2:
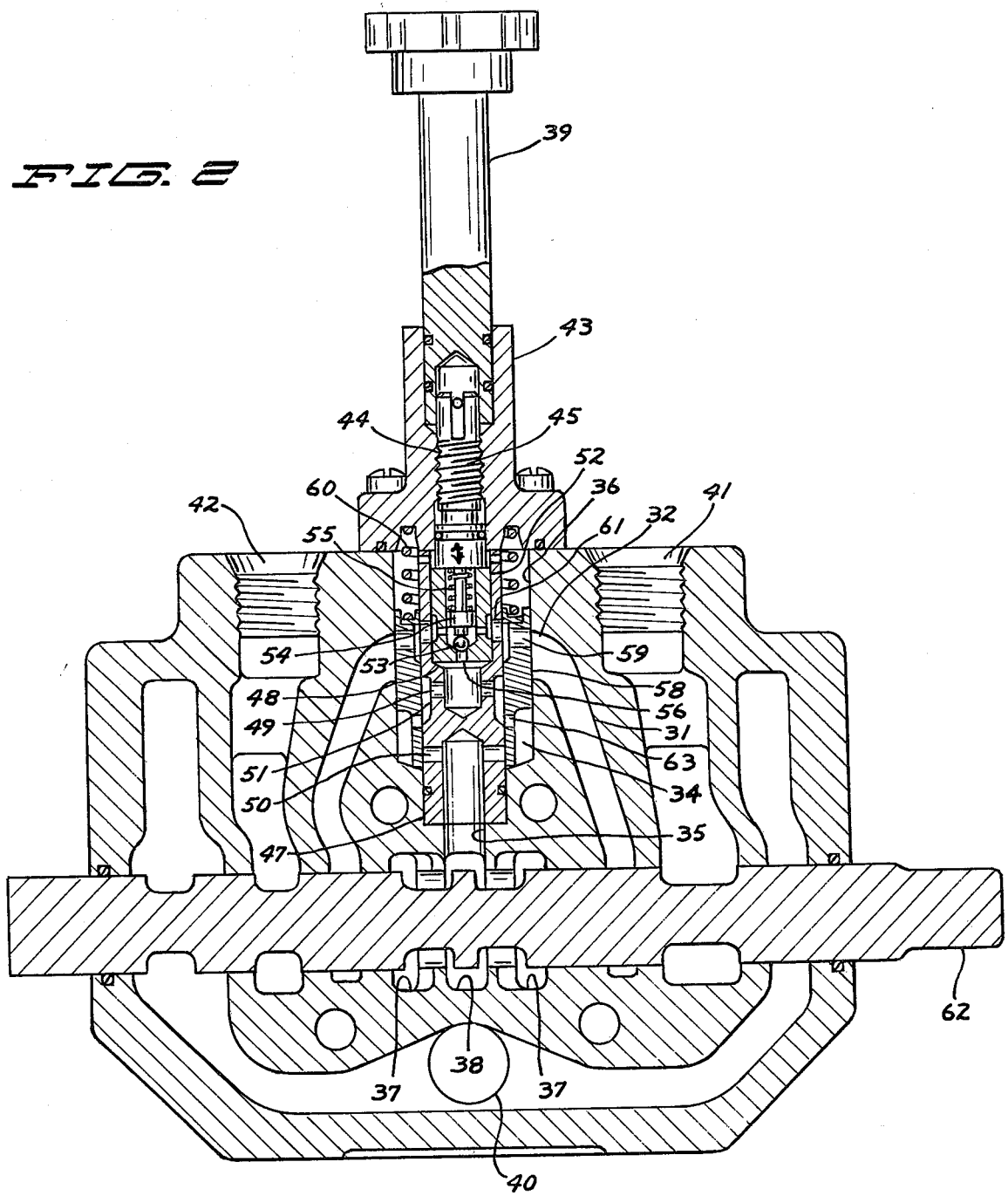

When valve spool 62 is displaced from the neutral position shown in FIG. 2 of the drawings, the open center existing between pump inlet 37 and downstream outlet 38 is closed causing a rise in pressure in high pressure main 33. The presence of fluid under pressure in high pressure groove 34 is transmitted through cross hole 63 in flow control 58 and through cross holes 49 in fixed sleeve 47 to valve seat 48. The application of pressure will cause check valve 52 to rise against adjustable stop 45, which will be assumed to have been adjusted to allow check valve 52 to rise far enough so as to establish an orifice adjacent cross hole 61 on fixed sleeve 47. The limited movement of check valve 52 will establish an orifice that is variable in size according to the relative position of adjustable stop 45. Fluid under pressure will flow through cross hole 61 and into cross hole 59 in flow control sleeve 58 and thence to high pressure groove 32 and high pressure loop 31 and through one or the other of cylinder ports 41 or 42 to the load connected to upstream valve 11.

In the event that excess fluid under pressure beyond that which may flow through the orifice existing between check valve 52 and seat 48 on fixed sleeve 47 is present, an increase in pressure is applied to the lower ends of flow control sleeve 58 which causes it to rise upwardly against the downward force exerted upon it by spring 60. This serves to connect excess fluid duct 35 with high pressure groove 34 to allow the excess fluid to flow to downstream outlet 38. The cylinder pressure existing at cross holes 59 in communication with loop 31 is sufficient to maintain a balance to allow continued flow of fluid due to the pressure differential between the fluid in high pressure groove 34 and the cylinder pressure as determined by biasing spring 60.

Ball check valve 53 is operable within check valve 52 and orifice 56 to allow a minimum flow of fluid through check valve 52 to loop 31 in the event adjustable stop 45 is positioned so as to prevent the formation of an orifice between fixed sleeve 47 and check valve 52.

It may be noted in the operation described above, that the excess fluid is supplied to the downstream outlet 38. In the stack valve shown in FIG. 1 of the drawings, this would be applied to downstream valve 12 and would normally pass through its open center to exhaust. In the event the spool in downstream valve 12 has been moved to connect one or the other of its cylinder ports to a load, the open center would be closed as it was with upstream valve 11 and the excess fluid could no longer bypass through the open center. This would cause an increase in pressure in upstream valve 1 and flow control sleeve 58 would be subjected to a higher force tending to move it upwardly against spring 60.

At this time, the increase in pressure in high pressure main 33 and high pressure groove 34 is transmitted through the orifice between check valve 52 and seat 48 on fixed sleeve 47 to the top of flow control sleeve 58 to balance the increase in pressure and maintain the desired controlled flow to the load through cross holes 59. Any excess of fluid above the flow which will be determined by the settings of upstream valve 11 and downstream valve 12 will be supplied to exhaust through the excess fluid duct in valve 12 that would be connected to a downstream outlet that is in turn connected to exhaust.

It has been determined under conditions of multiple operation of individual valve sections, that if the pressure requirements of the loads are substantially the same, or if the downstream valve requirement is not substantially lower, the upstream valve will satisfy its requirement first and the downstream valve may then be satisfied.

I claim:

1. An adjustable flow control for a hydraulic valve of the class above described comprising in combination; a valve body having a bore and including a high pressure main in communication therewith, cylinder ports in communication therewith, exhaust ports in communication therewith, and a high pressure loop in communication therewith, and a spool slidably disposed in said bore for selectively connecting said cylinder ports to said high pressure loop and to said exhaust ports; and flow control means disposed intermediate said high pressure main, said high pressure loop and an exhaust port, said flow control means including a flow control bore in the valve body, said flow control bore being in fluid communication with the high pressure loop, the high pressure main and an exhaust port and having flow control means disposed therein, intermediate said high pressure main, said high pressure loop and an exhaust port and further including a stationary sleeve disposed coaxially of said flow control bore having a seat for coacting with check valve means operable therein to prevent flow of fluid from said high pressure loop to said high pressure main in a first position, and to permit a variable controlled flow of fluid to said high pressure loop from said high pressure main in a second position, means adjustably disposed on said valve body for engaging said flow control means in said second position whereby said second position of said flow control means is varied so as to provide a variable orifice intermediate said flow control means and the seat therefor in said stationary sleeve, and flow control means slidably disposed coaxially on said stationary sleeve and operable in response to a predetermined pressure in the high pressure main to bypass excess fluid to an exhaust port.

2. The apparatus of claim 1 in which the slidable flow control sleeve includes further means operative to control the flow of fluid from the high pressure main to the high pressure loop.

3. The apparatus of claim 1 in which the flow control sleeve is biased to its inoperable position.

4. The apparatus of claim 2 in which the flow control sleeve is biased to its inoperable position.

* * * * *